US005179978A

United States Patent [19]

Simms et al.

[11] Patent Number: 5,179,978

[45] Date of Patent: Jan. 19, 1993

[54] ROTARY INK VALVE ASSEMBLY FOR CONTROLLING INK OR PRINTING FLUID INPUT IN A PRINTING PRESS

[75] Inventors: Tammy J. Simms, Darien; Frederick J. Whiting, La Grange, both of Ill.

[73] Assignee: Rockwell International Corporation, El Segundo, Calif.

[21] Appl. No.: 737,856

[22] Filed: Jul. 30, 1991

[51] Int. Cl.$^5$ .......... F16K 11/085

[52] U.S. Cl. .......... 137/625.46; 137/625.11; 137/563

[58] Field of Search .......... 137/625.46, 625.11, 137/563

[56] References Cited

U.S. PATENT DOCUMENTS

| | | | |
|---|---|---|---|
| 2,447,423 | 8/1948 | Nies | 137/625.11 |
| 2,641,280 | 6/1953 | Fleischhaver | 137/625.11 X |
| 3,190,584 | 6/1965 | Gire et al. | 137/625.46 X |

*Primary Examiner*—Arnold Rosenthal

*Attorney, Agent, or Firm*—C. B. Patti; V. L. Sewell; H. F. Hamann

[57] ABSTRACT

A rotary ink valve assembly with a plurality of rotary ink valves contained in a housing (10), having a stationary outer portion (16) with first and seconds ends (50, 52) connected by a cylindrical body (54) having at least one bypass aperture (42) adjacent the first end (50) and at least one ink output aperture (40) adjacent the second end (52). A substantially tubular inner portion (18) rotates within the cylindrical interior area (56) of the outer portion (16) with at least one bypass aperture (66) in the side wall (64) adjacent a first closed end (60) and at least one ink output aperture (68) in the side wall (64) adjacent a second open end (62). Ink is supplied to at least the open second end (62) for supplying ink to the inner portion (18) while the inner portion (18) is rotated by means (28, 32, 34) between an open position, a closed position and an intermediate position. In the open position only the ink outupt aperture (68) in the inner portion (18) aligns with the ink output apertures (40) in the outer portion (16). In the closed position only the bypass aperture (66) in the inner portion aligns with the bypass aperture (42) in the outer portion (16). In the intermediate position none of the apertures (40 adn 68 or 42 and 66) are in alignment.

23 Claims, 8 Drawing Sheets

INK OUTPUT OPEN

INK OUTPUT INTERMEDIATE

INK OUTPUT CLOSED

BYPASS CLOSED

BYPASS INTERMEDIATE

BYPASS OPEN

ROTARY INK VALVE ASSEMBLY FOR CONTROLLING INK OR PRINTING FLUID INPUT IN A PRINTING PRESS

BACKGROUND OF THE INVENTION

The present invention relates to ink input systems for use in high speed, high volume printing processes such as in offset lithographic printing.

In the field of high speed lithographic printing, ink is continuously conveyed from an ink source by means of a series of rollers to a planographic printing plate on a plate cylinder in a lithographic printing press. Image portions of the printing plate accept ink from one or more of the last of a series of inking rollers and transfer a portion of that ink to a blanket cylinder as a reverse image from which a portion of the ink is transferred to form a correct-reading image on paper or other materials. It is also essential in conventional lithographic printing processes that a dampening solution containing water and proprietary additives be conveyed continuously to the printing plate whereby transferring in part to the non-image areas of the printing plate the water functions to keep those non-image areas free of ink. Finally, in conventional printing press systems, the ink is continuously made available in varying amounts determined by cross-press column input control adjustments to a plurality of ink injectors.

Lithographic printing plate surfaces in the absence of imaging materials have minute interstices and a hydrophilic or water-loving property to enhance retention of water, that is the dampening solution, rather than ink on the surface of the plate. Imaging the plate creates oleophilic or ink-loving areas according to the image that is to be printed. Consequently, when both ink and dampening solution are presented to an imaged plate in appropriate amounts, only the ink tending to reside in non-image areas becomes disbonded from the plate. In general, this action accounts for the continuous ink and dampening solution differentiation on the printing plate surface, which is essential and integral to the lithographic printing process.

It is necessary to control the correct amount of ink supplied from each of the ink injectors during lithographic printing. Prior art ink injectors are of the type having a piston style pump wherein the stroke of the piston is controlled in order to vary the volume of ink or printing fluid output of the ink injectors. These prior art ink injectors are complex mechanical mechanisms with many moving parts. They are therefore prone to malfunction and to breakage of their moving components. Also, precisely controlling the volume of ink output by these prior art ink injectors is difficult.

Certain commercially successful newspaper printing configurations rely on the inking train rollers to carry dampening solution to the printing plate. Notable among these are the Goss Metro, Goss Metroliner, and the Goss Headliner Offset printing presses which are manufactured by the Graphic Systems Division of Rockwell International Corporation. In these alternative configurations, the dampening solution is combined with the ink on an inking oscillator drum such that both ink and water are subsequently and continuously transferred to the inking form rollers for deposition onto the printing plate. These conventional lithographic systems require complex adjusting systems and mechanisms for the ink injectors in order to maintain ink and dampening solution balance, such as disclosed in U.S. Pat. No. 3,534,663.

The present invention overcomes the aforementioned problems, difficulties and inconveniences, yet retains all of the principles essential to prior art variable-input inking systems. Accordingly, in this improvement the numerous mechanical parts of the prior art ink injectors are eliminated resulting in a more dependable, smaller and simplified ink or printing fluid input apparatus.

SUMMARY OF THE INVENTION

It is a general object of the present invention to provide an improved ink valve for use in a printing press.

It is another object of the present invention to provide a rotary ink valve which divides a constant stream of fluid into timed discharge.

It is yet another object of the present invention to provide a rotary ink valve which provides greater fluid control than that found in the prior art.

It is yet another object of the present invention to provide a rotary ink valve which has a zero setting for which no ink or printing fluid is discharged from the rotary ink valve.

It is a further object of the present invention to provide a rotary ink valve which has a closed position, an open position and an intermediate position, wherein the open position outputs ink, the closed position allows the ink to still flow through the rotary ink valve and the intermediate position provides for an accurate division between the open and closed positions.

In general terms the present invention is a rotary ink valve for providing ink in a printing press having an ink supply. The rotary ink valve has a stationary outer portion having first and second ends connected by a body and a substantially tubular inner portion having first and second ends connected by a side wall. The body of the outer portion has a substantially cylindrical interior area and the inner portion lies within and is rotatable within this cylindrical interior area of the outer portion. Each of the inner and outer portions has at least one bypass aperture adjacent the first end and at least one ink output aperture adjacent the second end of the respective body and side wall of the inner and outer portions. In the outer portion the first and second ends are open and in the inner portion only the second end is open. The ink supply in the printing press is coupled to the open end of the inner portion for supplying ink to the inner portion. Also provided is a means for rotating the inner portion between at least an open position, a closed position and an intermediate position, the intermediate position being between the open and closed positions.

In the open position only the ink output aperture in the inner portions aligns with the ink output aperture in the outer portion such that ink flows only from the ink output aperture of the outer portion. In the closed position only the bypass aperture in the inner portion aligns with the bypass aperture in the outer portion, such that ink flows only from the ink output aperture of the outer portion. In the intermediate position the apertures in the outer portion are misaligned with apertures in the inner portion such that no ink flows from either the bypass aperture in the outer portion or from the ink output aperture in the outer portion.

In a preferred embodiment of the present invention the outer portion has a plurality of bypass apertures spaced around the body and the inner portion has a corresponding plurality of a bypass aperture spaced around the side wall. Similarly the outer portion has a plurality of ink output apertures spaced around the body and the inner portion has a plurality of ink output apertures spaced around the side wall. In the closed position the bypass apertures in the inner and outer portions are in alignment and in the open position the ink output apertures in the inner and outer portions are in alignment. As stated above in the intermediate position none of the apertures in the outer portion align with any of the apertures in the inner portion. Also, in the preferred embodiment the plurality of bypass apertures in the side wall of the inner portion is longitudinally aligned with the plurality of ink output apertures in the side wall of the inner portion, whereas the plurality of bypass apertures in the body of the outer portion are not longitudinally aligned with the plurality of ink output apertures in the body of the outer portion.

The rotary ink valve of the present invention further comprises in a preferred embodiment a means for sealing between the first ends of the inner and outer portions to prevent ink leaking therebetween. The means for sealing has at least interchangeable first and second annular seals and at one interchangeable annular spacer. Furthermore, in the preferred embodiment the outer portion has a collar wherein the collar has a bottom attached to the first end of the outer portion and a top containing a slot. The inner portion has a disk, the disk having a lower surface attached to the first end of the inner portion and a stop pin extending from the lower surface for engaging the slot. The disk also has an upper surface and an activating pin extending from the upper surface for engagement by the means for rotating the inner portion. The first end of the inner portion extends through the collar of the outer portion. In this embodiment the collar has the means for sealing the first end of the inner portion. The collar may also have a means for holding the outer portion stationary as the inner portion is rotated. The means for holding engages a corresponding part on a housing in which the rotary ink valve is contained. In the preferred embodiment the housing has a cylindrical cavity for receiving the body of the outer portion and in this embodiment the body is cylindrical. First and second recessed annular areas in an outer surface of the body of the outer portion are provided respectively at the bypass aperture and the ink output aperture in the outer portion. In the preferred embodiment the means for rotating the rotary ink valve has normally open and normally closed opposed air valves connected by shuttle piston, the shuttle piston having a shaft with a groove for engaging the activating pin on the disk of the inner portion of the rotary ink valve.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
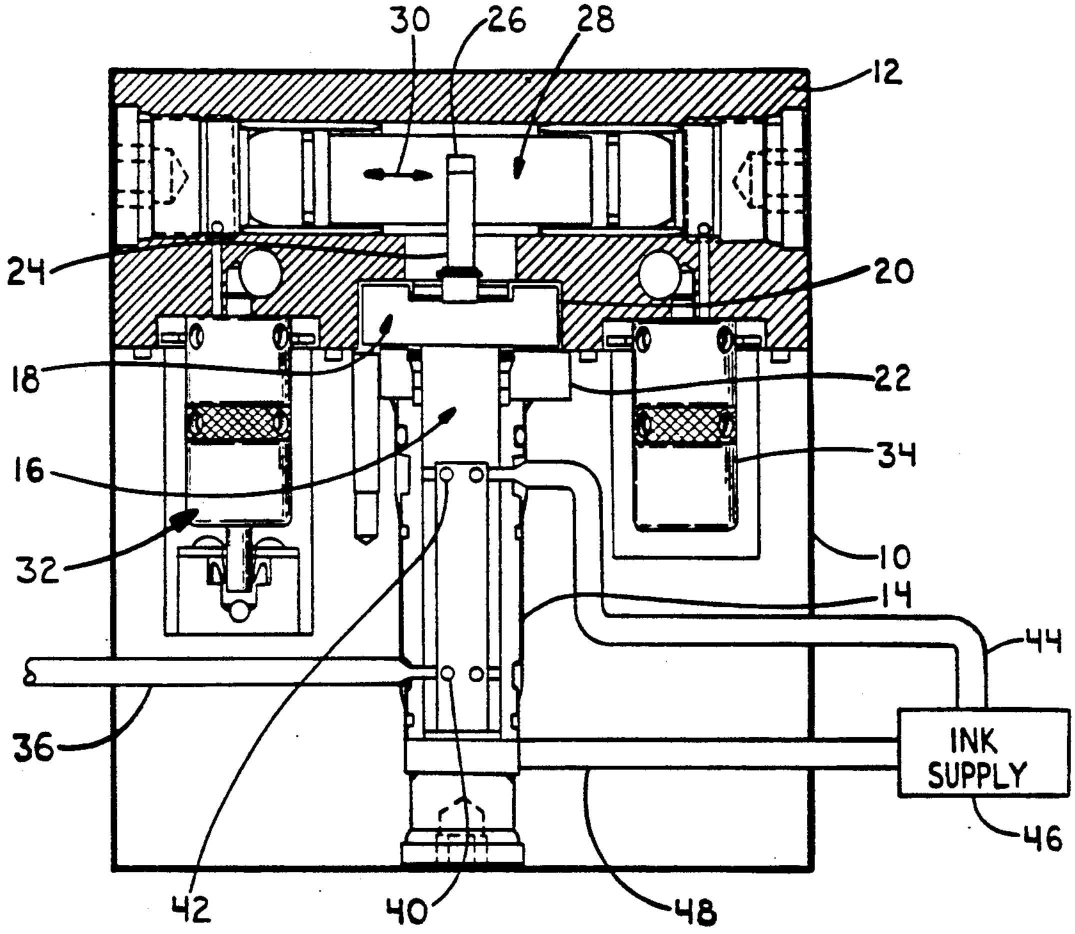
FIG. 1 is a cross-sectional view of the rotary ink valve of the present invention contained in a housing and cover.
Figure 2:
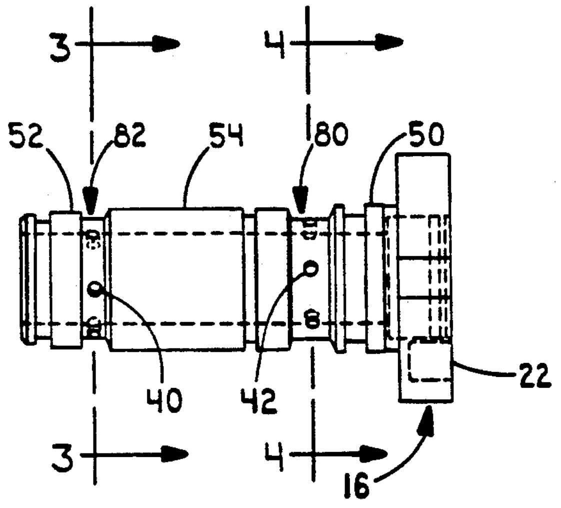
FIG. 2 is a side view of the outer portion of the rotary ink valve.

The present invention has general applicability but is most advantageously utilized in a printing press having an ink supply. Although the preferred embodiment of the present invention uses the rotary ink valves for supplying ink, also referred to as printing fluid when the ink is mixed with dampening fluid or other materials, the novel rotary ink valve can be used for supplying other fluids or even gases in other applications.

In the preferred embodiment of the present invention the novel rotary ink valve is air actuated and provides for dividing a constant stream of ink or fluid into timed discharges. As a result, the volume of ink discharged is optimally controlled. In the prior art the volume of ink discharged was controlled by utilizing a piston type pump in modifying the stroke of the pump in order to vary the fluid volume. In the rotary ink valve of the present invention greater fluid control is achieved with fewer moving mechanical parts than in the prior art. Furthermore, it is an important feature of the rotary ink valve of the present invention that this valve has a zero or intermediate setting where no fluid is discharged. During operation of the rotary ink valve ink flows from the ink output apertures of the outer portion of the ink valve when the valve is in an open position. In a closed position ink flows from the valve from bypass apertures so that the ink is allowed to substantially continually flow through the rotary ink valve. This provides for more controlled operation. However, it is an important feature of the present invention that effects due to differences in pressure levels between the ports connected to the bypass aperture and the ink output aperture are minimized because of the intermediate position of the rotary ink valve.

In the intermediate position none of the apertures in the outer portion align with the apertures in the inner portion. This guarantees that there is no inner action between the ink flowing from the ink output apertures and the bypass apertures. During operation of the rotary ink valve, the valve is changed from the open position to the closed position in one movement and thus the intermediate position occurs only momentarily while the inner portion rotates. Thus although there is a moment when no ink flows from the rotary ink valve, the ink does substantially flow through the valve.

During operation the rotary ink valve is controlled such that the time spent in the open position compared to the time spent in the closed position is adjusted as a function of the ink demand by the printing press. This is accomplished by timed energizing and de-energizing of the normally open and normally closed air valves which move a shuttle piston back and forth resulting in the rotary movement of the inner portion of the rotary ink valve. It is an important aspect of the present invention that the drive is symmetrical such that the travel time of the shuttle piston is the same in either direction. It is the dwell time of the shuttle position at one or the other of its two extreme positions which is a function of the ink required by the printing press. Also, in the preferred embodiment if there is a malfunction in the printing press the normally open and normally closed air valves are configured such that a default position is when the valves are not energized and corresponds to the closed position of the rotary ink valve.

Figure 6:
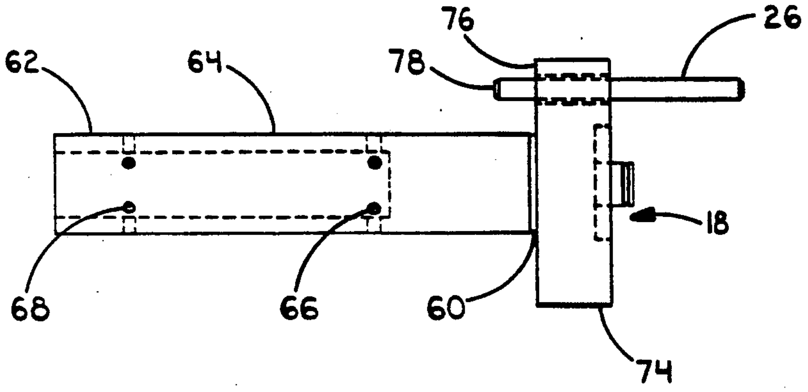
FIG. 6 is a side view of the inner portion of the rotary ink valves.
Figure 8:
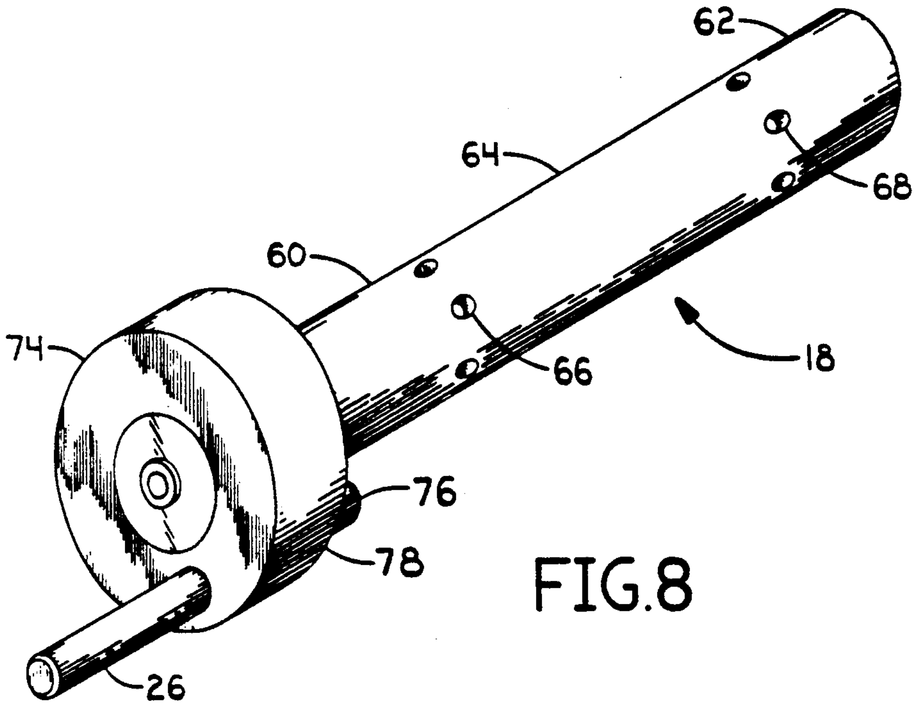
FIG. 8 is a perspective view of the inner portion of the rotary ink valve.
Figure 7:
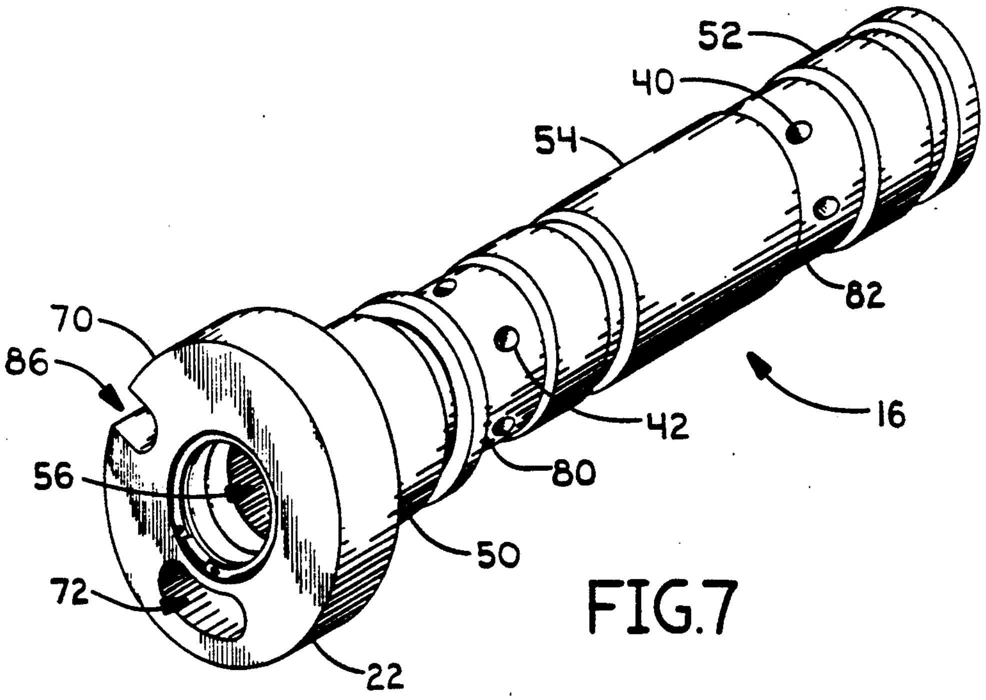
FIG. 7 is a perspective view of the outer portion of the rotary ink valve.
Figure 9:
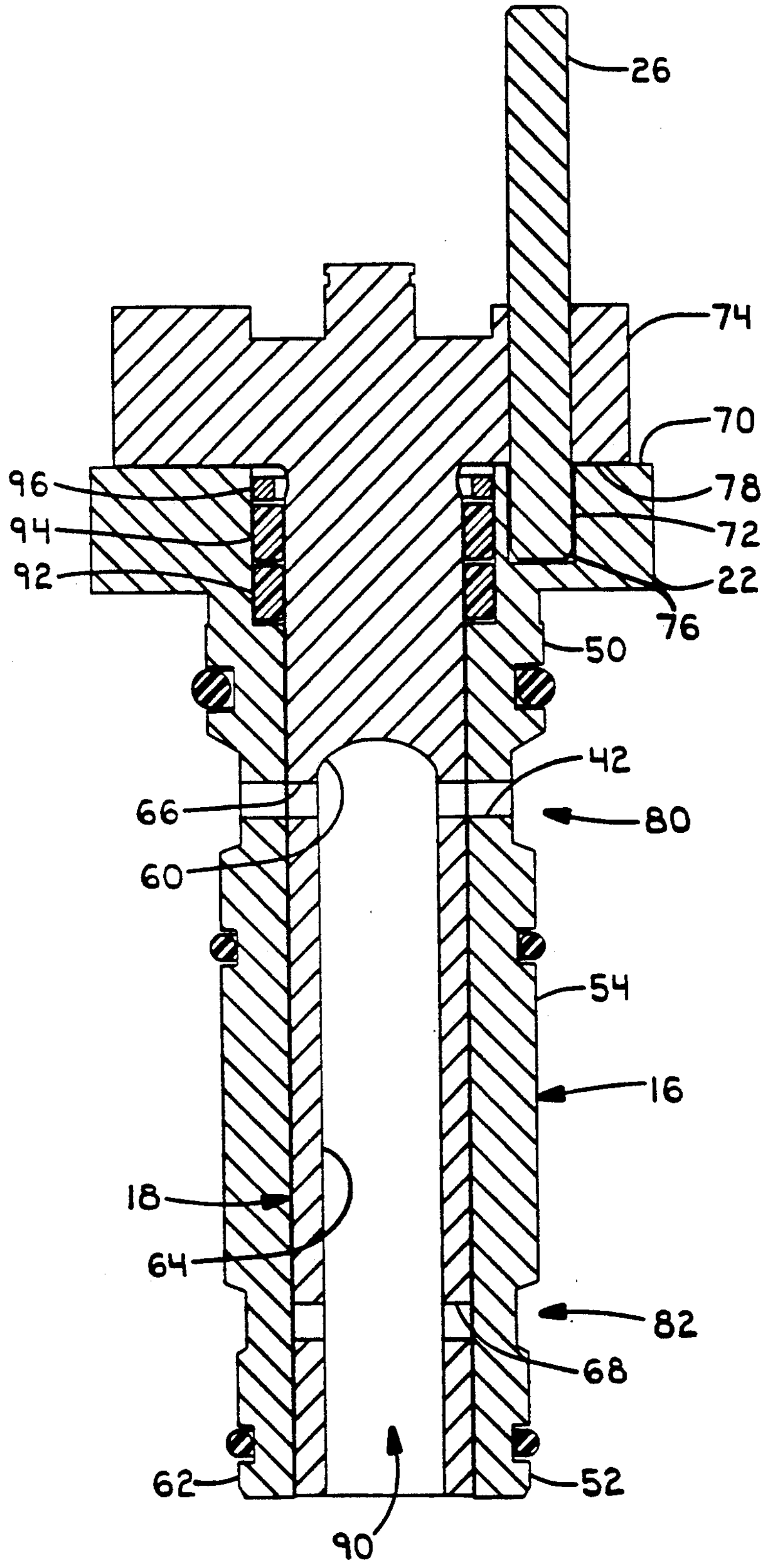
FIG. 9 is a cross-sectional view of the inner portion assembled with the outer portion of the rotary ink valve.

The novel rotary ink valve of the present invention is shown contained in a housing in a cross-sectional view in FIG. 1. A perspective view of the outer and inner portions of the rotary ink valve is depicted in FIGS. 7 and 8 respectively. FIGS. 2–5 are various views of the outer portion and FIG. 6 is a side view of the inner portion. FIG. 9 is a cross-sectional view of the inner portion assembled with the outer portion.

The rotary ink valve of the present invention is depicted in FIG. 1 wherein it is contained in a housing 10 to which is attached a cover 12. The housing 10 has a substantially cylindrical cavity 14 which contains the outer portion 16 of the rotary ink valve. The inner portion 18 of the rotary ink valve fits snugly within the outer portion 16 and is held in place by a circular aperture 20 in the cover 12. The cover 12 secures the outer portion 16 within the cavity 14 of the housing 10 by overlapping an edge of a collar 22 on the outer portion 16.

An activating pin 24 on the inner portion 18 engages a slot 26 in a shuttle piston 28. The shuttle piston 28 is operated in the direction of arrows 30 by normally opened air valve 32 and normally closed air valve 34. When the valves 32, 34 are energized the shuttle piston 28 moves in one direction to the limit of its travel and when the air valves 32, 34 are de-energized the shuttle piston 28 moves to the other limit of its travel. The slot 26 in the shuttle piston 28 and the activating pin 24 of the rotatable inner portion 18 translate the linear motion of the shuttle piston 28 to a rotary motion of the inner portion 18.

In the preferred embodiment the housing 10 has an ink outlet port 36 which communicates with the ink output apertures 40 of the outer portion 16. Bypass apertures 42 of the outer portion 16 communicate with a bypass port 44 in the housing 10.

An ink supply 46 provides ink under pressure to an ink inlet port 48 in the housing 10. The ink inlet port 48 routes ink to the inner portion 18 as will be described below. The bypass port 44 is connected to the ink supply 46 for circulating the ink through the rotary ink valve when the valve is in the closed position. Also, as will be described later, the housing 10 can contain a plurality of rotary ink valves.

Referring now to FIGS. 2–9, the outer portion 16 has first and second ends 50, 52 connected by a body 54. The body 54 has a substantially cylindrical interior area 56 and has a plurality of bypass apertures 42 adjacent the first end 50 and a plurality of ink output apertures 40 adjacent the second end 52, the first and second ends 50 and 52 being open. The inner portion 18 is a substantially tubular configuration and has first and second ends 60, 62 connected by a side wall 64. The inner portion 18 has a plurality of bypass apertures 66 in the side wall 64 adjacent the first end 60 and a plurality of ink output apertures 68 and the side wall 64 adjacent the second end 62, the second end 62 being open and the first end 60 being closed.

In the preferred embodiment a collar 22 is attached to the first end 50 of the outer portion 16 and has a top 70 containing a slot 72. The inner portion 18 has a disk 74 attached to the first end 60 of the inner portion 18. The disk 74 has a stop pin 78 extending from a lower surface 76 thereof. When the inner portion 18 is inserted into the interior area 56 of the outer portion 54 the stop pin 76 engages the slot 72. This provides for positive stop limits in both directions of rotation of the inner portion 18.

In the preferred embodiment the outer portion 16 has a first recessed annular area 80 at the location of the bypass apertures 42 and a second recessed annular area 82 at the location of the ink output apertures 40. This allows for the housing to contain a single ink outlet port 36 for the ink output apertures 40 in the outer portion 16 and a single bypass port 44 for the bypass apertures 42 in the outer portion 16. Also, the ink outlet port 36 and the bypass port 42 can be located at any position around the circumference of the outer portion 16.

Figure 3:
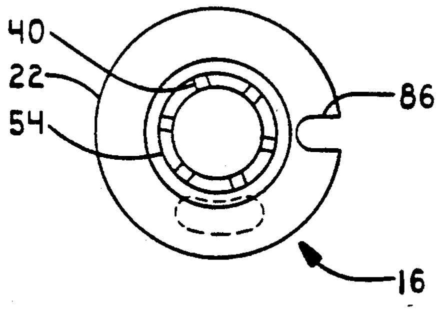
FIG. 3 is a cross-sectional view of the outer portion depicting the bypass apertures.
Figure 4:
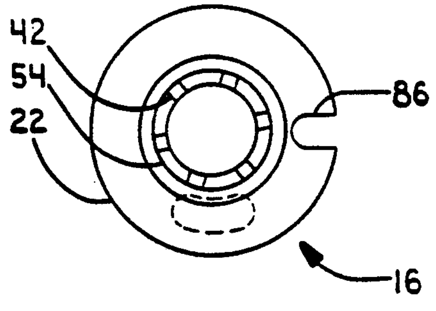
FIG. 4 is a cross-sectional view of the outer portion depicting the ink output apertures.
Figure 5:
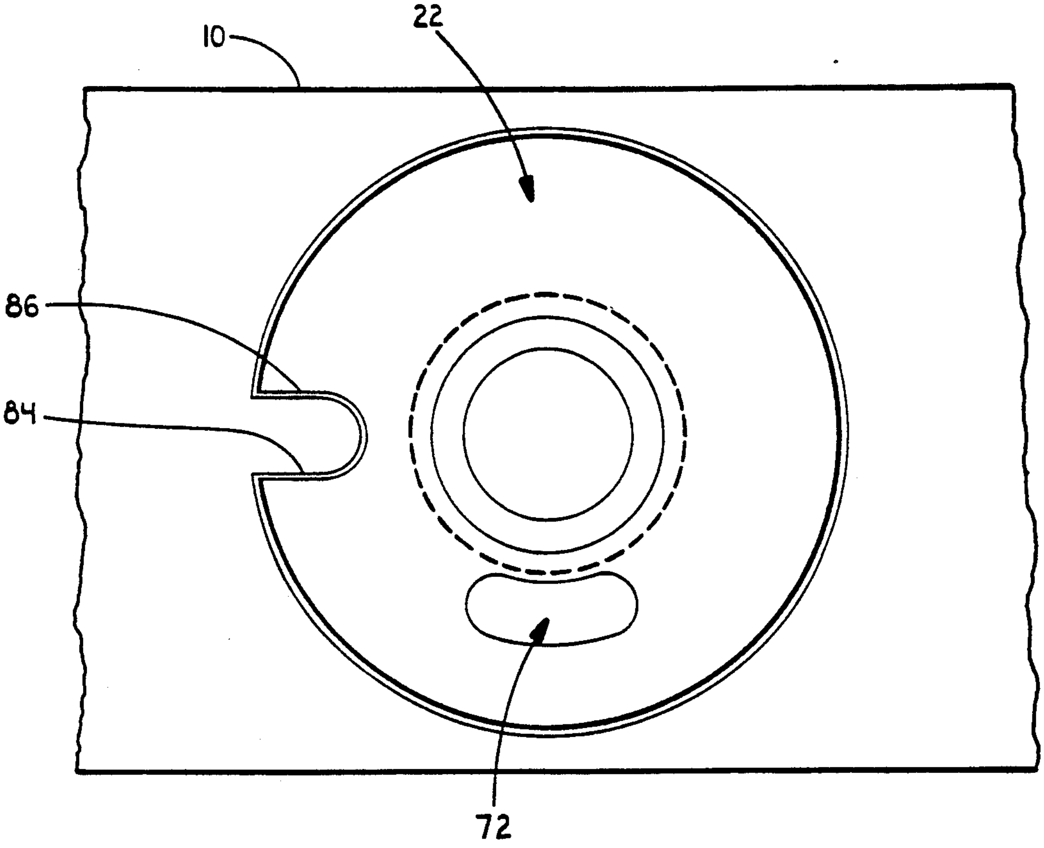
FIG. 5 is a top view of the outer portion.
Figure 10A:
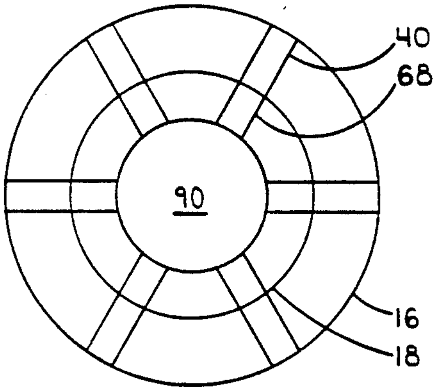
FIGS. 10A-10F schematically depict the relationship of the ink outlet apertures (FIGS. 10A, 10B, 10C) of the inner and outer portions and the bypass apertures (FIGS. 10D, 10E, 10F) of the inner and outer portions for the open position (FIGS. 10A, 10D), the intermediate position (FIGS. 10B, 10E) and the closed position (FIGS. 10C, 10F) of the rotary ink valve.
Figure 10B:
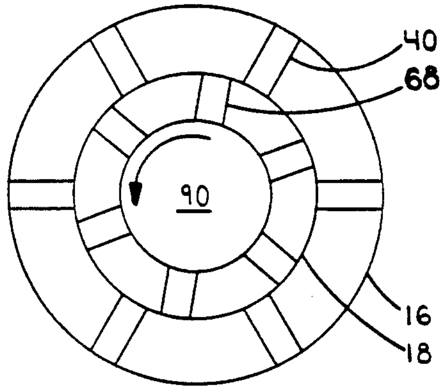
Figure 10C:
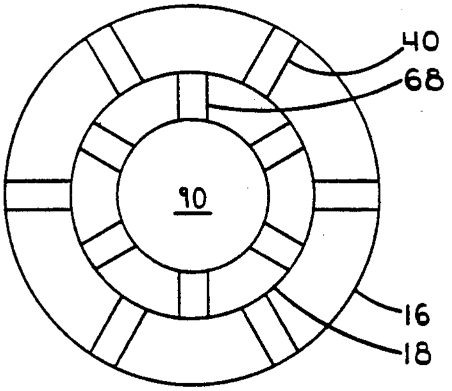
Figure 10D:
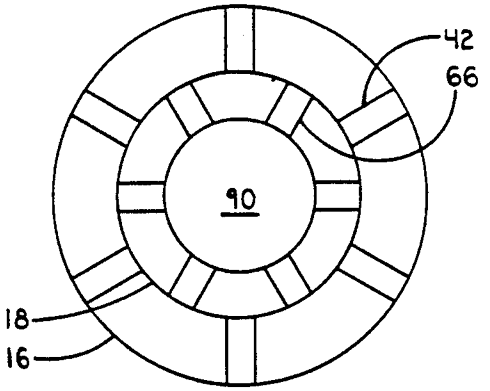
Figure 10E:
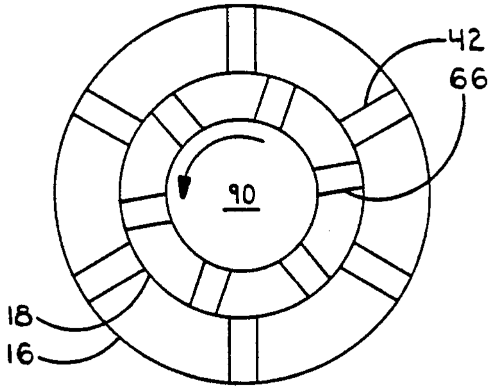
Figure 10F:
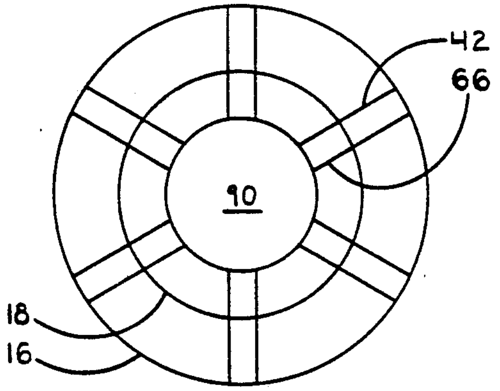

The housing 10 further has an antirotation part 84 for engaging a slot 86 in the collar 22 of the outer portion 16. In the preferred embodiment this is required so that as the inner portion 18 rotates back and forth within the outer portion 16, the outer portion 16 is prevented from moving. In the preferred embodiment as can be clearly seen, for example, in FIG. 7, the outer portion 16 has a circular cross-sectional configuration. In the outer portion 16 the plurality of bypass apertures 42 are misaligned with the plurality of ink output apertures 40. Conversely, the plurality of bypass apertures 66 in the inner portion 18 are in alignment with the plurality of ink output apertures 68 (see FIG. 8). In the preferred embodiment and as depicted in FIGS. 3 (cross-section of the outer portion 16 at the ink output apertures 40) and FIG. 4 (cross-section of the bypass apertures 42) the pattern of ink output apertures 40 is offset by approximately 38° from the pattern of bypass apertures 42. Also, in the preferred embodiment six bypass apertures 42 and six ink output apertures 40 are utilized. The relationship of the ink output apertures 40 and 68 are depicted in FIG. 10A and the relative position of the bypass apertures 42 and 66 are depicted in FIG. 10D for an open position of the rotary ink valve. As can be clearly seen, the ink output apertures 40 and 68 are in alignment and the bypass apertures 42 and 66 are not in alignment and therefore ink will flow from the interior 90 of the inner portion 16 through the ink output apertures 40 and 68. In the intermediate position depicted in FIG. 10B for the ink output apertures 40 and 68 and in FIG. 10E for the bypass apertures 42 and 66, none of the apertures 40 and 68 or 42 and 66 are in alignment and thus for this intermediate position, as the inner portion 18 rotates within the outer portion 16, ink cannot flow from either the bypass apertures 42 or the ink output apertures 40 of the outer portion 16. Finally, in the closed position of the rotary ink valve, the bypass apertures 42 and 66 are in alignment and the ink output apertures 40 and 68 are not in alignment, thereby permitting ink to flow and circulate through the rotary ink valve while the valve is in the closed position.

Figure 11A:
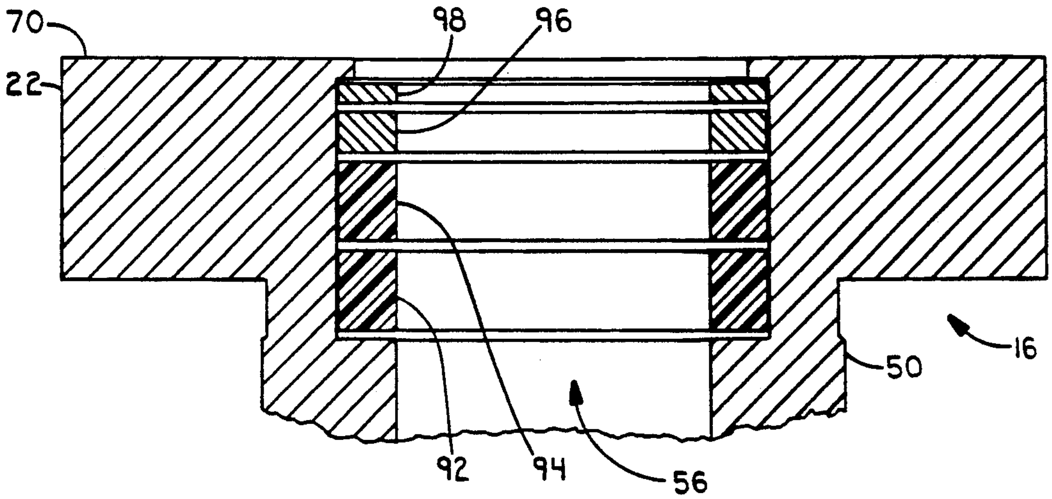
FIGS. 11A and 11B are cross-sectional views depicting the interchangeable sealing parts of the means for sealing in two different configurations.
Figure 11B:
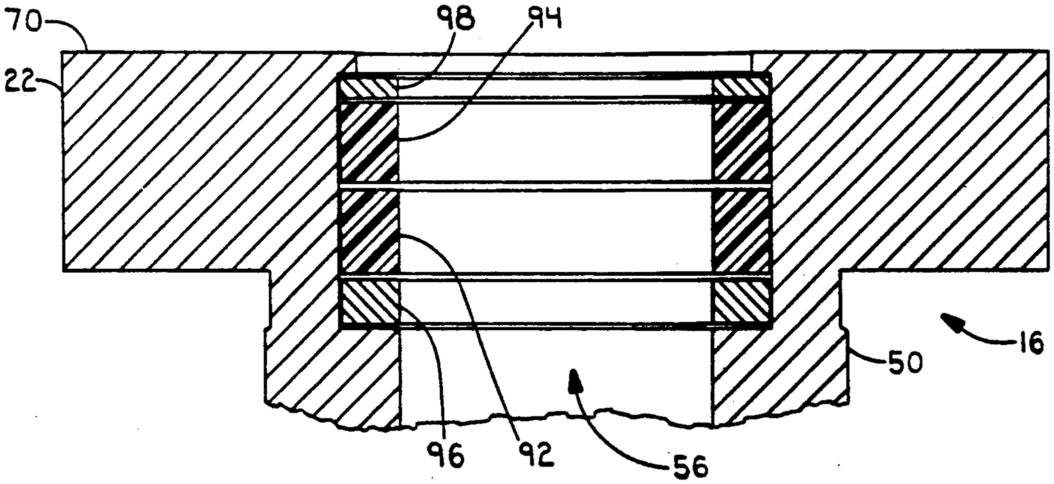

In order to prevent ink from leaking between the first ends 50 and 60 of the inner and outer portions 18, 16 a means for sealing is provided in the first end 50 or in the preferred embodiment as depicted in FIGS. 11A and 11B substantially in the collar 22 of the outer portion 16. The means for sealing is inventively composed of at least first and second interchangeable annular seals 92 and 94 and at least one interchangeable annular spacer 96. The annular seals 92, 94 can be made of any suitable seal or gasket material. As depicted in FIG. 11A the annular seals 92 and 94 are adjacent one another with the annular spacer 96 located near the top surface 70 of the collar 22. A C-ring 98 holds the seals 92, 94 and the spacer 96 in position. After a period of operation in which the seals may tend to wear, the seals 92 and 94 can be rearranged with the spacer 96. For example, as depicted in FIG. 11B, the seals 92, 94 have been interchanged with the spacer 96 allowing the seals 92, 94 to contact the side wall 64 at the first end 60 of the inner portion 18 at a slightly different location which will provide a new sealing capacity to the rotary ink valve.

Figure 12:
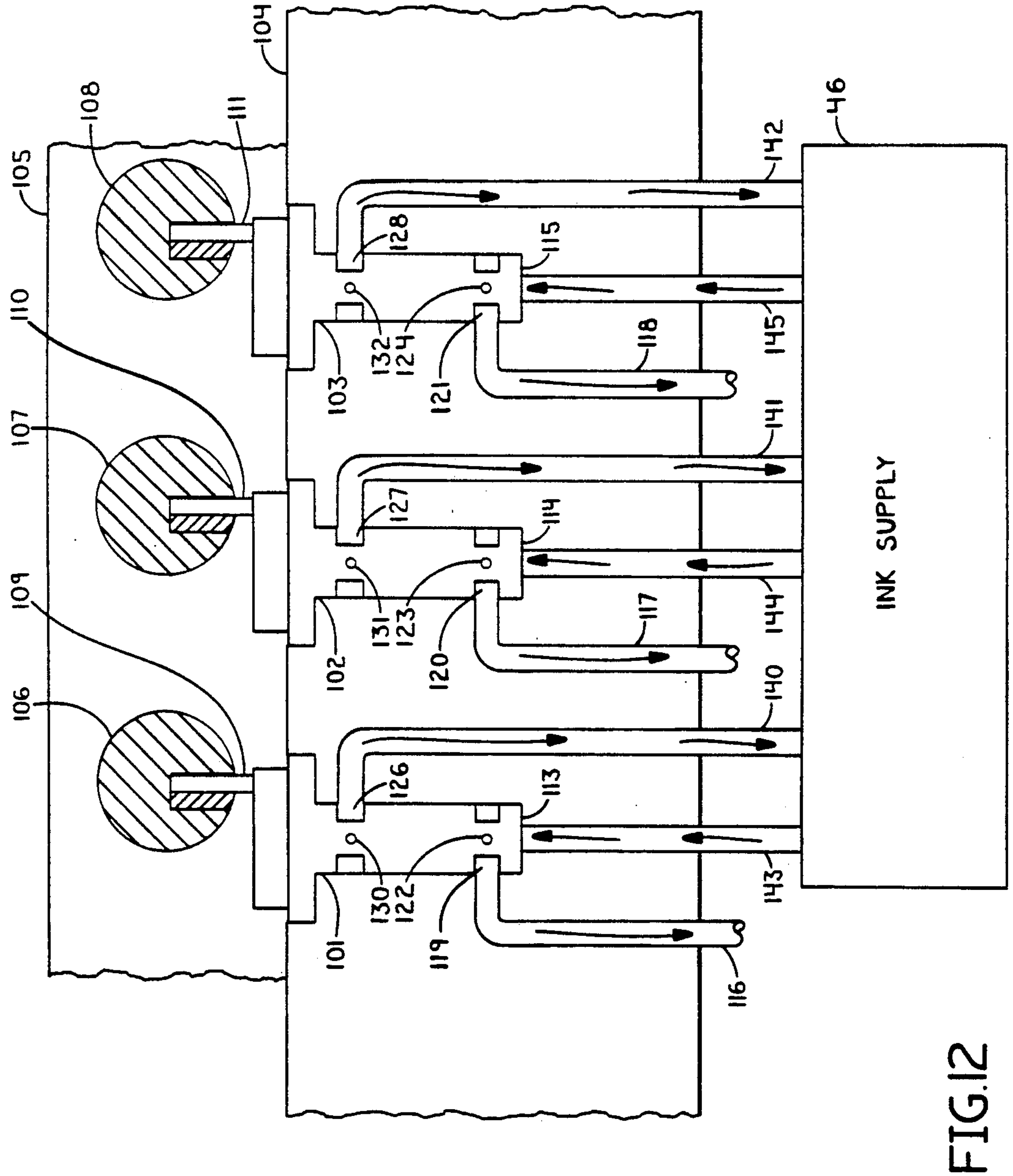
FIG. 12 is a cross-sectional view schematically depicting a rotary ink valve assembly consisting of a plurality of rotary ink valves in a housing and cover.

FIG. 12 depicts an embodiment of the present invention in which a plurality of rotary ink valves 101, 102 and 103 are contained in a housing 104 to which a cover 105 is attached. The cover 105 contains shuttle pistons 106, 107 and 108 which respectively engage activating pins 109, 110 and 111 of the rotary ink valves 101, 102 and 103. Ink inlet ports 143, 144, 145 in the housing 104 supplies ink from the ink supply 4 to the open bottom ends 113, 114 and 115, respectively, of the three rotary ink valves 101, 102 and 103, that is, to the open second 62 of the inner portion 18 of each of the rotary ink valves. Individual ink outlet ports 116, 117 and 118 communicate respectively with the second recessed annular portions 119, 120 and 121 of the rotary ink valve in which the ink output apertures 122, 123 and 124 are respectively located. Bypass ports 140, 141, 142 are contained in the housing and connected to the ink supply 46 and are also connected to the first recessed areas 126, 127, 128, respectively, of the rotary ink valves 101, 102 and 103 having bypass apertures 130, 131 and 132, respectively. The arrows depicted in FIG. 12 indicate the direction of ink flow, not simultaneously but rather as explained above. Thus it can be seen that depending upon the application, any plurality of rotary ink valves can be utilized in a single housing and can easily replace the prior art type ink injector mechanisms.

Although in the preferred embodiment the means for rotating, that is, the shuttle plunger and air valves are contained in the cover which is attached to the housing with the rotary ink valves contained in the housing, other configurations can be utilized by those skilled in the art regarding the placement of the components with regards to the cover and housing in numerous different configurations and would still be within the spirit and scope of the present invention. In a typical operation of a printing press, the air pressure for actuating the normally open and normally closed air valves is approximately 40 to 60 psi and the valves are energizing and de-energized within a cycle range of 12 seconds through 1½ seconds for varying the volume of ink provided by the rotary ink valves. Although the rotary ink valves can be placed in the open position to provide a continuous stream of ink at the ink output ports of the housing, in a printing press application it has been found to be advantageous to cycle the rotary ink valves between the open and closed positions and to vary the dwell time in the open and closed positions to thereby control the amount of ink supplied to the printing press. Thus the ink which is supplied to the printing press is not supplied as a continuous stream, but rather as timed discharges of ink.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A rotary ink valve for providing ink in a printing press having an ink supply, comprising:

stationary outer portion having first and second ends connected by a body, said body having a substantially cylindrical interior area and having a plurality of bypass apertures in said body adjacent said first end of said outer portion and a plurality of ink output apertures in said body adjacent said second end of said outer portion, said first and second ends being open;

substantially tubular inner portion lying within and rotatable within said cylindrical interior area of said outer portion and having first and second ends connected by a side wall, and having a plurality of bypass apertures in said side wall adjacent said first end of said inner portion and a plurality of ink output apertures in said side wall adjacent said second end of said inner portion, said second end being open and said first end being closed;

said ink supply coupled to at least said open second end of said inner portion for supplying ink to said inner portion; and means for rotating said inner portion between at least an open position, a closed position and an intermediate position, said intermediate position being between said open and closed positions;

wherein, in said open position only said plurality of ink output apertures in said inner portion aligns with said plurality of ink output apertures in said outer portion such that ink flows from said plurality of ink output apertures of said outer portion, wherein in said closed position, only said plurality of bypass apertures in said inner portion aligns with said plurality of bypass apertures in said outer portion, such that ink flows from said plurality of bypass apertures of said outer portion, and wherein in said intermediate position said plurality of bypass apertures and said plurality of ink output apertures in each of said inner and outer portions are misaligned such that no ink flows from said plurality of bypass apertures of said outer portion and no ink flows from said plurality of ink output apertures of said outer portion.

2. The rotary valve for providing ink in a printing press according to claim 1, wherein said outer portion has a plurality of bypass apertures spaced around said body and said inner portion has a plurality of bypass apertures spaced around said side wall, each bypass aperture of said plurality of bypass apertures in said inner portion simultaneously aligning with a respective bypass aperture of said plurality of bypass apertures in said outer portion when said rotatable ink valve is in said closed position, and wherein said outer portion has a plurality of ink output apertures spaced around said body and said inner portion has a plurality of ink output apertures spaced around said side wall, each ink output aperture of said plurality of ink output apertures in said inner portion simultaneously aligning with a respective ink output aperture of said plurality of ink output apertures in said outer portion when said rotatable ink valve is in said open position.

3. A rotary ink valve for providing ink in a printing press having an ink supply, comprising:

stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open;

said outer portion having a plurality of bypass apertures spaced around said body and said inner portion having a plurality of bypass apertures spaced around said side wall, said plurality of bypass apertures in said inner portion aligning with respective bypass apertures in said outer portion when said rotatable ink valve is in said closed position, and wherein said outer portion has a plurality of ink output apertures spaced around said body and said inner portion has a plurality of ink output apertures spaced around said side wall, said plurality of ink output apertures in said inner portion aligning with respective ink output apertures in said outer portion when said rotatable ink valve is in said open position;

said plurality of bypass apertures in said side wall of said inner portion being longitudinally aligned with said plurality of ink output apertures in said side wall of said inner portion, and wherein said plurality of bypass apertures in said body of said outer portion being longitudinally misaligned with said plurality of ink output apertures in said body of said outer portion;

substantially tubular inner portion lying within and rotatable within said cylindrical interior area of said outer portion and having first and second ends connected by a side wall, and having at least one bypass aperture in said side wall adjacent said first end of said inner portion and at least one ink output aperture in said side wall adjacent said second end of said inner portion, said second end being open and said first end being closed;

said ink supply coupled to at least said open second end of said inner portion for supplying ink to said inner portion; and means for rotating said inner portion between at least an open position, a closed position and an intermediate position, said intermediate position being between said open and closed positions;

wherein, in said open position only said at least one ink output aperture in said inner portion aligns with said at least one ink output aperture in said outer portion such that ink flows from said at least one ink output aperture of said outer portion, wherein in said closed position, only said at least one bypass aperture in said inner portion aligns with said at least one bypass aperture in said outer portion, such that ink flows from said at least one bypass aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

4. A rotary ink valve for providing ink in a printing press having an ink supply, comprising:

stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open;

substantially tubular inner portion lying within and rotatable within said cylindrical interior area of said outer portion and having first and second ends connected by a side wall, and having at least one bypass aperture in said side wall adjacent said first end of said inner portion and at least one ink output aperture in said side wall adjacent said second end of said inner portion, said second end being open and said first end being closed;

said ink supply coupled to at least said open second end of said inner portion for supplying ink to said inner portion;

means for sealing between said first ends of said inner and outer portions to prevent ink leaking therebetween, said means for sealing having at least interchangeable first and second annular seals and at least one interchangeable annular spacer; and means for rotating said inner portion between at least an open position, a closed position and an intermediate position, said intermediate position being between said open and closed positions;

wherein, in said open position only said at least one ink output aperture in said inner portion aligns with said at least one ink output aperture in said outer portion such that ink flows from said at least one ink output aperture of said outer portion, wherein in said closed position, only said at least one bypass aperture in said inner portion aligns with said at least one bypass aperture in said outer portion, such that ink flows from said at least one bypass aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

5. A rotary ink valve for providing ink in a printing press having an ink supply, comprising:

stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open;

said at least one bypass aperture in said side wall of said inner portion being longitudinally aligned with said at least one ink output aperture in said side wall of said inner portion and wherein said at least one bypass aperture in said body of said outer portion being longitudinally misaligned with said at least one ink output aperture in said body of said outer portion;

substantially tubular inner portion lying within and rotatable within said cylindrical interior area of said outer portion and having first and second ends connected by a side wall, and having at least one bypass aperture in said side wall adjacent said first end of said inner portion and at least one ink output aperture in said side wall adjacent said second end of said inner portion, said second end being open and said first end being closed;

said ink supply coupled to at least said open second end of said inner portion for supplying ink to said inner portion; and means for rotating said inner portion between at least an open position, a closed position and an intermediate position, said intermediate position being between said open and closed positions;

wherein, in said open position only said at least one ink output aperture in said inner portion aligns with said at least one ink output aperture in said outer portion such that ink flows from said at least one ink output aperture of said outer portion, wherein in said closed position, only said at least one bypass aperture in said inner portion aligns with said at least one bypass aperture in said outer portion, such that ink flows from said at least one bypass aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

6. A rotary ink valve for providing ink in a printing press having an ink supply, comprising:

stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open;

said outer portion having a collar, said collar having a bottom attached to said first end of said outer portion and a top containing a slot, and wherein said inner portion having a disk, said disk having a lower surface attached to said first end of said inner portion and a stop pin extending from said lower surface for engaging said slot, and said disk having an upper surface and an activating pin extending from said upper surface for engagement by said means for rotating said inner portion, said first end of said inner portion extending through said collar of said outer portion;

substantially tubular inner portion lying within and rotatable within said cylindrical interior area of said outer portion and having first and second ends connected by a side wall, and having at least one bypass aperture in said side wall adjacent said first end of said inner portion and at least one ink output aperture in said side wall adjacent said second end of said inner portion, said second end being open and said first end being closed;

said ink supply coupled to at least said open second end of said inner portion for supplying ink to said inner portion; and means for rotating said inner portion between at least an open position, a closed position and an intermediate position, said intermediate position being between said open and closed positions;

wherein, in said open position only said at least one ink output aperture in said inner portion aligns with said at least one ink output aperture in said outer portion such that ink flows from said at least one ink output aperture of said outer portion, wherein in said closed position, only said at least one bypass aperture in said inner portion aligns with said at least one bypass aperture in said outer portion, such that ink flows from said at least one bypass aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

7. The rotary ink valve for providing ink in a printing press according to claim 6, wherein said collar has means for sealing said first end of said inner portion such that ink is prevented from leaking between said first end of said inner portion and said collar.

8. The rotary ink valve for providing ink in a printing press according to claim 6, wherein said at least one bypass aperture in said side wall of s id inner portion is longitudinally aligned with said at least one ink output aperture in said side wall of said inner portion and wherein said at least one bypass aperture in said body of said outer portion is longitudinally misaligned with said at least one ink output aperture in said body of said outer portion.

9. The rotary ink valve for providing ink in a printing press according to claim 6, wherein said collar has means for holding said outer portion stationary as said inner portion is rotated.

10. The rotary ink valve for providing ink in a printing press according to claim 1, wherein said inner portion fits snugly within said cylindrical interior area of said outer portion.

11. A rotary ink valve for providing ink in a printing press having an ink supply, comprising:

stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open;

said at least one bypass aperture being located in a recessed annular area in an outer surface of said body of said outer position;

substantially tubular inner portion lying within and rotatable within said cylindrical interior area of said outer portion and having first and second ends connected by a side wall, and having at least one bypass aperture in said side wall adjacent said first end of said inner portion and at least one ink output aperture in said side wall adjacent said second end of said inner portion, said second end being open and said first end being closed;

said ink supply coupled to at least said open second end of said inner portion for supplying ink to said inner portion; and means for rotating said inner portion between at least an open position, a closed position and an intermediate position, said intermediate position being between said open and closed positions;

wherein, in said open position only said at least one ink output aperture in said inner portion aligns with said at least one ink output aperture in said outer portion such that ink flows from said at least one ink output aperture of said outer portion, wherein in said closed position, only said at least one bypass aperture in said inner portion aligns with said at least one bypass aperture in said outer portion, such that ink flows from said at least one bypass aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

12. A rotary ink valve for providing ink in a printing press having an ink supply, comprising:

stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open;

said at least one ink output aperture being located in a recessed annular area in an outer surface of said body of said outer portion;

substantially tubular inner portion lying within and rotatable within said cylindrical interior area of said outer portion and having first and second ends connected by a side wall, and having at least one bypass aperture in said side wall adjacent said first end of said inner portion and at least one ink output aperture in said side wall adjacent said second end of said inner portion, said second end being open and said first end being closed;

said ink supply coupled to at least said open second end of said inner portion for supplying ink to said inner portion; and means for rotating said inner portion between at least an open position, a closed position and an intermediate position, said intermediate position being between said open and closed positions;

wherein, in said open position only said at least one ink output aperture in said inner portion aligns with said at least one ink output aperture in said outer portion such that ink flows from said at least one ink output aperture of said outer portion, wherein in said closed position, only said at least one bypass aperture in said inner portion aligns with said at least one bypass aperture in said outer portion, such that ink flows from said at least one bypass aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

13. The rotary ink valve for providing ink in a printing press according to claim 6, wherein said means for rotating comprises normally open and normally closed opposed air valves connected by a shuttle piston, said shuttle piston having a shaft with a groove for engaging said activating pin.

14. A rotary ink valve assembly for providing ink in a printing press having an ink supply, comprising:

at least one rotary ink valve having a stationary outer portion and a substantially tubular inner portion;

said stationary outer portion having first and second ends connected by a body, said body having a substantially cylindrical interior area and having at least one bypass aperture in said body adjacent said first end of said outer portion and at least one ink output aperture in said body adjacent said second end of said outer portion, said first and second ends being open, said at least one bypass aperture located in a first recessed annular area in an outer surface of said body of said outer portion and said at least one ink output aperture located in a second recessed annular area in said outer surface of said body of said outer portion;

said substantially tubular inner portion lying within and rotatable within said cylindrical interior area of said outer portion and having first and second ends connected by a side wall, having at least one bypass aperture in said side wall adjacent said first end of said inner portion and at least one ink output aperture in said side wall adjacent said second end of said portion, said second end being open and said first end being closed;

at least one means for rotating said inner portion between at least an open position, a closed position and an intermediate position, said intermediate position being between said open and closed positions;

said outer portion also having a collar, said collar having a bottom attached to said first end of said outer portion and a top containing a slot, said inner portion having a disk, said disk having a lower surface attached to said first end of said inner portion and a stop pin extending from said lower surface for engaging said slot, said disk having an upper surface and an activating pin extending from said upper surface for engagement by said means for rotating said inner portion, said first end of said inner portion extending through said collar of said outer portion;

housing means having at least one substantially cylindrical cavity for containing said body of said outer portion of said at least one rotary ink valve, said cavity having an ink inlet port in a bottom thereof for supplying ink to said open first end of said inner portion of said at least one ink valve, said housing means also having at least one ink outlet port aligned with said second recessed annular area of said body and at least one bypass outlet port aligned with said first recessed annular area of said body;

cover means for retaining at least said outer portion of said at least one rotary ink valve in said housing means and attached to said housing, said cover means substantially containing said means for rotating said inner portion;

wherein, in said open position only said at least one ink output aperture in said inner portion aligns with said at least one ink output aperture in said outer portion such that ink flows from said at least one ink output aperture of said outer portion, wherein in said closed position, only said bypass aperture in said inner portion aligns with said at least one bypass aperture in said outer portion, such that ink flows from said at least one ink output aperture of said outer portion, and wherein in said intermediate position said at least one bypass aperture and said at least one ink output aperture in each of said inner and outer portions are misaligned such that no ink flows from said at least one bypass aperture of said outer portion and no ink flows from said at least one ink output aperture of said outer portion.

15. The rotary ink valve assembly for providing ink in a printing press according to claim 14, wherein said at least one bypass port in said housing is connected to said ink inlet port in said housing for circulating the ink when said at least one rotary ink valve is in said closed position.

16. The rotary ink valve assembly for providing ink in a printing press according to claim 14, wherein said housing has at least one antirotation part for engaging said slot in said collar of said outer portion, said body of said outer portion having a circular outer cross-sectional configuration.

17. The rotary ink valve assembly for providing ink in a printing press according to claim 14, wherein said collar has a diameter greater than a diameter of said disc, and wherein said cover means has a circular aperture having a diameter substantially equal to said diameter of said disc such that said cover secures said outer portion in said housing means by overlapping an outer edge of said collar when said cover means is attached to said housing means.

18. The rotary ink valve assembly for providing ink in a printing press according to claim 14, wherein said outer portion has a plurality of bypass apertures spaced around said body and said inner portion has a plurality of bypass apertures spaced around said side wall, said plurality of bypass apertures in said inner portion aligning with said plurality of bypass apertures in said outer portion when said at least one rotatable ink valve is in said closed position, and wherein said outer portion has a plurality of ink output apertures spaced around said body and said inner portion has a plurality of ink output apertures spaced around said side wall, said plurality of ink output apertures in said inner portion aligning with said plurality of ink output apertures in said outer portion when said at least one rotatable ink valve is in said open position.

19. The rotary ink valve assembly for providing ink in a printing press according to claim 18, wherein said plurality of bypass apertures in said side wall of said inner portion is longitudinally aligned with said plurality of ink output apertures in said side wall of said inner portion, and wherein said plurality of bypass apertures in said body of said outer portion is longitudinally misaligned with said plurality of ink output apertures in said body of said outer portion.

20. The rotary ink valve assembly for providing ink in a printing press according to claim 14, wherein said at least one rotary ink valve further comprises means for sealing between said first ends of said inner and outer portions to prevent ink leaking there-between, said means for sealing having at least interchangeable first and second annular seals and at least one interchangeable annular spacer.

21. The rotary ink valve assembly for providing ink in a printing press according to claim 14, wherein said at least one bypass aperture in said side wall of said inner portion is longitudinally aligned with said at least one ink output aperture in said side wall of said inner portion and wherein said at least one bypass aperture in said body of said outer portion is longitudinally misaligned with said at least one ink output aperture in said body of said outer portion.

22. The rotary ink valve assembly for providing ink in a printing press according to claim 14, wherein said housing means has a plurality of substantially cylindrical cavities for containing a respective plurality of rotary ink valves and wherein said cover means has a plurality of respective means for rotating said rotary ink valves.

23. The rotary ink valve assembly of claim 1 in which said plurality of bypass apertures in said side wall of said inner portion being longitudinally aligned with said plurality of ink output apertures in said side wall of said inner portion and said plurality of bypass apertures in said body of said outer portion being longitudinally misaligned with said plurality of ink output apertures in said body of said outer portion.

* * * * *